United States Patent [19]

Alesson

[11] Patent Number: 4,679,727

[45] Date of Patent: Jul. 14, 1987

[54] THERMOSTATIC STEAM TRAP WITH SELF-CENTERING VALVE

[75] Inventor: Thomas Alesson, Plains, Pa.

[73] Assignee: Nicholson Division, Datron Systems, Inc., Wilkes-Barre, Pa.

[21] Appl. No.: 896,054

[22] Filed: Aug. 13, 1986

[51] Int. Cl.⁴ .............................................. F16T 1/10
[52] U.S. Cl. ................................. 236/56; 236/93 A; 251/84
[58] Field of Search ......................... 236/56, 58, 93 A; 137/183, 219; 251/84; 138/44, 42

[56] References Cited

U.S. PATENT DOCUMENTS

| | | | |
|---|---|---|---|
| 1,646,686 | 10/1927 | Crosby | 236/58 |
| 1,797,280 | 3/1931 | Zerk | 138/42 X |
| 2,914,251 | 11/1959 | Morgan | 236/56 |
| 3,403,853 | 10/1968 | Monroe, Jr. | 236/56 |
| 4,616,778 | 10/1986 | Thieme | 236/58 |

FOREIGN PATENT DOCUMENTS

| | | | |
|---|---|---|---|
| 740509 | 7/1932 | France | 236/56 |
| 303754 | 12/1929 | United Kingdom | 236/58 |

Primary Examiner—William E. Tapolcai
Attorney, Agent, or Firm—Paul & Paul

[57] ABSTRACT

A thermostatic steam trap is described wherein a thermostatic actuating means including a valve is mounted for axial movement of the valve into and away from sealing contact with a valve seat positioned axially of the hollow cylindrical body of the steam trap by a circular baffle which loosely engages both the actuating means and portions of the body of the steam trap. The baffle is oriented transversely of the hollow cylindrical body at the inlet end of the steam trap and has nonarcuate segments formed upon its periphery, thereby causing diversion of the steam flow away from direct impingement upon the thermostatic actuating means, while ensuring good heat transfer to the thermostatic actuating means. This construction provides for a self-centering steam trap valve.

2 Claims, 3 Drawing Figures

4,679,727

THERMOSTATIC STEAM TRAP WITH SELF-CENTERING VALVE

FIELD OF THE INVENTION

This invention relates to the field of steam traps, and more particularly it relates to the construction of thermostatic steam traps that are normally installed in condensate lines of steam systems.

DESCRIPTION OF THE PRIOR ART

A conventional thermostatic steam trap comprises a sealed chamber having an inlet opening for connection to the steam source, an outlet opening for the discharge of condensate, a valve seat formed in the outlet opening, a valve adapted to seal the outlet opening in cooperation with the valve seat and a thermostatic actuating means adapted to move the valve into and out of sealing contact with the valve seat. Such a steam trap construction is shown in U.S. Pat. No. 3,197,141. It is also known to provide a baffle contained within the sealed chamber positioned to intercept the flow of steam entering the inlet opening, thereby preventing a direct course of steam from inlet opening through the outlet opening. In such conventional steam trap constructions, it is critical to provide accurately formed and machined parts in order that the combination of actuating means, valve and valve seat function to maintain accurate positions to ensure reproducible sealing action throughout the useful life of the steam trap. This criticality is especially important in view of the metallic construction of conventional steam traps and the working temperatures of steam and condensate with concomitant expansion and contraction.

It is an object of this invention to provide a thermostatic steam trap having a self-centering valve.

It is another object of this invention to provide a thermostatic steam trap employing an improved steam baffle construction that provides uniform protection from thermal and hydraulic shock for the valve actuating means and also an optimum steam flow distribution through the trap. These objects and certain advantages are achieved through the steam trap construction shown in the drawings, wherein:

DESCRIPTION OF THE PREFERRED EMBODIMENTS

Figure 1:
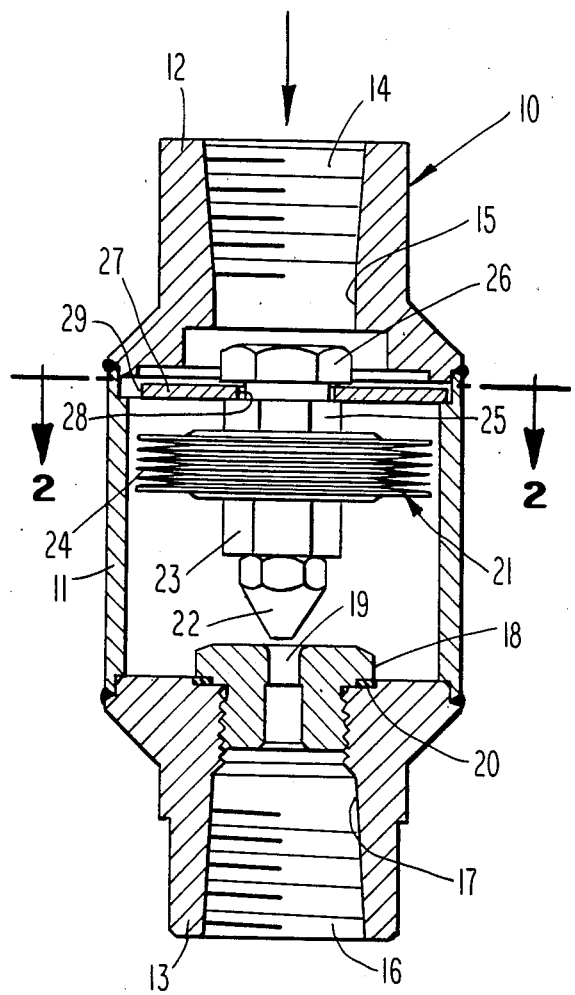
FIG. 1 is a view in vertical section through the center line of a steam trap constructed in accordance with this invention.
Figure 2:
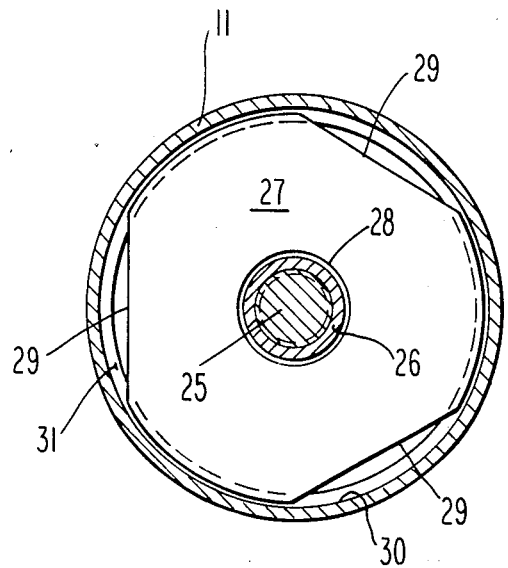
FIG. 2 is a plan view in horizontal section taken along the line 2—2 of FIG. 1.
Figure 3:
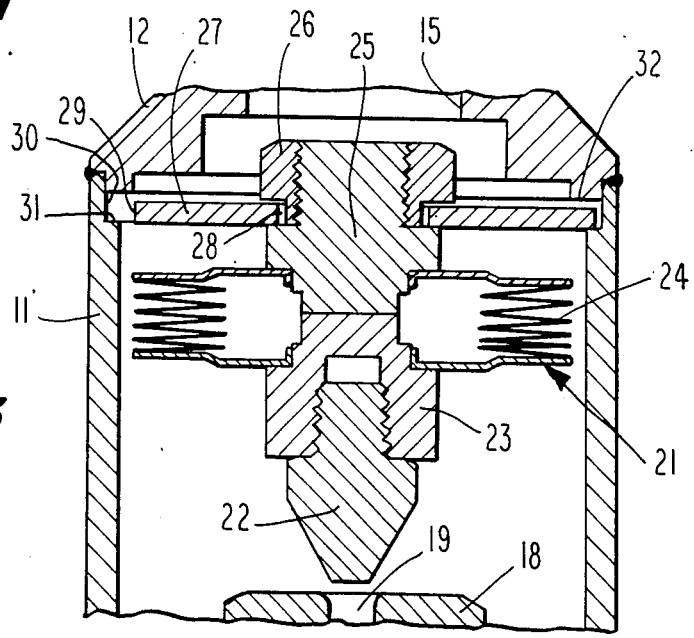
FIG. 3 is an enlarged view of a portion of the steam trap shown in FIG. 1, additional parts being shown in vertical section.

Referring now to FIG. 1, there is shown a steam trap having a hollow body 10, comprised of a medial cylindrical portion 11, an inlet connection 12 and an outlet connection 13. Inlet connection 12 has formed therein a threaded opening 14 at the end of a central bore 15 which communicates with the interior of body 10. Likewise outlet connection 13 has formed therein a threaded opening 16 at the distal end of bore 17, which communicates with the interior of body 10. The inner end of bore 17 is partially closed by a machined valve seat 18 threaded thereinto. Valve seat 18 has a discharge orifice 19 formed centrally thereof, and is sealed to the outlet connection 13 by a gasket 20. An actuating mechanism 21 is moveably retained within body 10, and comprises in combination a frustoconical valve 22, attached to one side of a female spud 23, a thermostatic bellows 24 attached to the other side of female spud 23, as well as to one side of a male stem 25, an actuator nut 26 attached the other side of male stem 25, and an impingement plate 27 positioned moveably between actuator nut 26 and male stem 25 by means of a central opening 28. Referring now to FIGS. 2 and 3, impingement plate 27 is of generally circular configuration and has formed upon its peripheral edge a plurality of non-arcuate segments 29, equidistantly spaced. The adjoining inner surfaces 30, 31, 32 of the inlet connection 12 and the cylindrical portion 11 are machined such that a properly dimensioned impingement plate 27 is loosely held therebetween causing the actuating mechanism 21 to be sustained in the position shown in FIG. 1. As thus positioned, frustoconical valve 22 is positioned in close proximity to the valve seat 18, substantially axially of the orifice 19. In normal operation, the heat from steam entering the body 10 of the steam trap causes the actuating mechanism 21 to force valve 22 into sealing contact with valve seat 18, closing orifice 19, and preventing steam loss. Since the actuating mechanism 21 is moveably retained within body 10, valve 22 is adapted to self-align concentrically with the orifice 19 of valve seat 18. Self-alignment of valve 22 being ensured, the steam trap opens and closes during its operational life without need for correctional adjustments. In certain embodiments, this trap construction is preferably furnished as a permanently sealed unit, although the component parts thereof may be constructed so as to permit access to the interior of the trap.

An additional advantage of the construction of this invention is the protection of the actuating mechanism from thermal and hydraulic shock. High pressure and high temperature steam bring about extreme shock when such steam is directly impinged onto a thermostatic element, leading to eventual damage thereof. While baffle systems are known, the provision of the impingement plate 27 upstream (steam flow indicated by the arrow in FIG. 1) of the thermostatic element and transversely of the cylindrical body 10 provides complete protection for the thermostatic bellows 24, since steam and pressurized condensate flow is diverted through spaces formed adjacent the inner surface of cylindrical portion 11 by the nonarcuate segments 29. Notwithstanding this diversion of the steam of condensate flow, the desirable quick-acting nature of a thermostatic steam trap is retained by virtue of the relative concentricity of the combined cylindrical portion 11, impingement plate 27 and bellows 24. The thus diverted steam or condensate flow is not only prevented from direct discharge onto the actuating mechanism 21, it is evenly distributed about the cylindrical portion 11, thereby ensuring immediate even heating of the thermostatic bellows 24. Moreover, the steam flow is caused to take a tortuous path through the trap, limiting excessive steam loss.

Referring now to FIG. 3, the detail of the actuating mechanism represents an embodiment of the steam trap of this invention wherein the thermostatic bellows 24 is partially filled with distilled water (not shown) under high vacuum. The actuating mechanism 21 is thereby compressed to the position shown, providing an open valve to discharge condensate. When steam enters the hollow body of the steam trap, the water fill of the thermostatic bellows 24 vaporizes, equalizing the pressure within, which quickly closes the valve 22 by spring action before steam is lost. Slight temperature differentials cause instant trap action on light or heavy loads. The characteristics of such water-filled actuating mechanisms match the saturated steam pressure-temperature curve.

Having thus described my invention, I claim:

1. A thermostatic steam trap comprising a hollow body having an inlet opening, an outlet opening, a valve seat formed in the outlet opening, a valve adapted to seal the outlet opening in cooperation with the valve seat, thermostatic actuating means adapted to move the valve into and out of sealing contact with the valve seat, and a baffle contained within the hollow body and adapted to intercept the flow of steam entering the inlet opening and to prevent said steam flow from taking a direct course between inlet and outlet openings, characterized by a cylindrical portion forming part of said hollow body, said cylindrical portion and remaining portions of said hollow body being so configured as to support a baffle in the form of a solid circular plate transversely of the cylindrical portion proximate to said inlet opening and so as to permit slight transverse and axial movement of said plate, said plate having formed therein a central opening so configured as to engage and retain said thermostatic actuating means in a position permitting said actuating means to axially move towards and away from said outlet opening, and also permitting said actuating means slight transverse and axial movement with respect to said plate, said thermostatic actuating means having said valve rigidly attached thereto, whereby upon operation of said actuating means to effect sealing contact of the valve with the valve seat, the valve is concentrically aligned with the valve seat by the relative motion between the hollow body, circular plate and thermostatic actuating means, said circular plate having additionally formed upon its peripheral edge a plurality of nonarcuate segments, thereby forming spaces between said segments and the adjacent inner surface of the cylindrical portion, whereby steam entering said inlet portion is diverted from directly impinging upon said thermostatic actuating means and indirectly passed to said outlet opening.

2. A thermostatic steam trap comprising in combination: a hollow body consisting of a medial cylindrical portion, an inlet connection at one end of the cylindrical portion and having an inlet opening formed therein, an outlet connection at the other end of the cylindrical portion and having an outlet opening formed therein; a valve seat mounted within said outlet opening in sealing relationship to said outlet connection, and having an orifice formed therein; a thermostatic actuating means having affixed thereto a valve adapted to close and open said orifice upon the operation of the actuating means; a baffle in the form of a solid circular plate retained at the end inlet connection of the cylindrical portion transversely thereof by loose-fitting engagement of the periphery of said plate with said hollow body, said plate additionally having a plurality of non-arcuate segments formed upon its peripheral edge, thereby forming spaces between said segments and the adjacent inner surface of the cylindrical portion, whereby steam entering said inlet portion is diverted from directly impinging upon said thermostatic actuating means; said plate additionally having a central opening formed therein which loosely engages said thermostatic actuating means in such manner that the actuating means is positioned to create axial motion of said valve toward and away from a closing position in said orifice.

* * * * *

UNITED STATES PATENT OFFICE
CERTIFICATE OF CORRECTION

Patent No. 4,679,727           Dated   July 14, 1987

Inventor(s)  Thomas Alesson

It is certified that error appears in the above-identified patent and that said Letters Patent are hereby corrected as shown below:

Column 2, line 51, "of", second occurrence, should read --or--

Signed and Sealed this

Seventeenth Day of November, 1987

Attest:

DONALD J. QUIGG

*Attesting Officer*           *Commissioner of Patents and Trademarks*